United States Patent

[11] 3,602,119

| [72] | Inventors | Paul J. Ernisse;<br>Robert L. Reynolds, both of Rochester, N.Y. |
|---|---|---|
| [21] | Appl. No. | 802,866 |
| [22] | Filed | Feb. 27, 1969 |
| [45] | Patented | Aug. 31, 1971 |
| [73] | Assignee | Eastman Kodak Company<br>Rochester, N.Y. |

[54] DRIVE MECHANISM FOR ROTATABLE FLASHCUBE SOCKET
4 Claims, 7 Drawing Figs.

[52] U.S. Cl. ............................................. 95/11 L, 240/37.1
[51] Int. Cl. ........................................... G03b 17/48
[50] Field of Search ........................................ 95/11, 11.5, 11.5 X, 11 L; 240/1.3, 37.1

[56] References Cited
UNITED STATES PATENTS

| 3,353,468 | 11/1967 | Beach............................ | 95/11.5 |
| 3,487,758 | 1/1970 | Rigolini et al................. | 95/11.5 |

Primary Examiner—Samuel S. Matthews
Assistant Examiner—Fred L. Braun
Attorneys—Robert W. Hampton and J. Addison Mathews ABSTRACT: A flashcube socket incorporated in a photographic camera is rotated intermittently by a pivotable drive lever actuated by a cam on a manually rotatable film winding member. A simple and reliable latch member carried by the drive lever disables the latter each time the socket has rotated through a predetermined angle to bring the next flashcube bulb into operative position, whereby the continuing rotation of the winding member has no influence on the socket until the latch member has been released by operation of the camera shutter.

PATENTED AUG 31 1971

3,602,119

PAUL J. ERNISSE
ROBERT L. REYNOLDS
INVENTORS

BY *J. Addison Matthews*

*Robert W. Hampton*
ATTORNEYS

DRIVE MECHANISM FOR ROTATABLE FLASHCUBE SOCKET

BACKGROUND OF THE INVENTION

1. Field of the Invention

The present invention relates to flash illumination photography and, more particularly, to means for incrementally rotating a flashcube socket incorporated in a camera so that successive flashcube bulbs are moved automatically into firing position.

2. Description of the Prior Art

It is well known to provide a camera with a rotatable socket member adapted to support a flashcube and to rotate the socket member incrementally in response to successive operations of the camera film-winding mechanism so that each bulb in the flashcube is moved, in turn, into firing position.

In previously known cameras of the type, the drive mechanism employed to rotate the flashcube socket customarily comprises gear or lever members or the equivalent rotatively coupling the socket member with a rotatable film-winding member. However, the angular rotation of the winding member during each successive advancement of the film is not related to the required indexing rotation of the flashcube with sufficient accuracy to permit positive coupling between the winding member and the socket member.

Accordingly, such cameras typically are provided with a socket-indexing device which positively arrests rotation of the socket member each time it has completed its required movement, without interferring with the continuing rotation of the winding member. For example, as illustrated and described in commonly assigned U.S. Pat. No. 3,353,468, issued Nov. 21, 1967, the drive mechanism may incorporate a friction clutch adapted to be overpowered when the rotation of the socket member is physically obstructed by the indexing device, which is released in response to the subsequent operation of the camera shutter.

Such cameras have also been provided with members which reciprocate to engage and rotate the flashcube socket upon winding of the camera film-winding mechanism, and which further include means for holding the reciprocal member out of engagement with the socket after the socket has been indexed the proper amount. Such an indexing means is disclosed, for example, in commonly assigned U.S. Pat. No. 3,354,300 issued Nov. 21, 1967.

Although the above-described types of socket drive mechanism have been employed successfully in many cameras, they are relatively complicated, correspondingly expensive and potentially troublesome, especially if the design of a particular camera imposes awkward space limitations on that mechanism

SUMMARY OF THE INVENTION

In accordance with the present invention, the means employed to translate manual rotation of the film-winding member into incremental rotation of the flashcube socket member comprises a drive lever pivotally supported for arcuate movement about an axis parallel to the rotational axes of those two members. When the winding member is rotated to advance the camera film, a cam structure on the winding member displaces the adjacent end of the drive lever against the influence of a spring, thereby causing a pawl tooth at the other end of the drive lever to move in the opposite direction, to engage and rotate the flashcube or flashcube socket.

The socket member preferably comprises a one-piece molded plastic part including a polygonal detent flange engaged with a detent spring which resiliently maintains it in any of its indexed positions. Additionally, a corresponding number of ratchet teeth or cams are provided on the socket member and are engageable in sequence by the pawl tooth, so that each complete movement of the drive lever indexes the socket to its next position.

To ensure that each film-winding operation will cause the socket to be rotated, the cam structure of the winding member comprises several similar symmetrically disposed cam lobes, at least one of which invariably will engage the drive lever and displace it through its complete movement range. However, in order that the socket member is indexed only to its next position, it is essential that the drive lever is not effectively operated by more than one cam lobe during a winding operation. Accordingly, a simple latch member carried by the drive lever is adapted to releasably retain the drive member beyond operable engagement with the cam structure as soon as any one of the cam lobes has moved that lever through its complete range of movement in opposition to the previously mentioned spring; thus, disabling the drive mechanism until the latch member is released upon completion of the film-advancing operation.

Various means for practicing the invention and other advantages and novel features thereof will be apparent from the following detailed description of an illustrative preferred embodiment of the invention, reference being made to the accompanying drawings in which like reference numerals denote like elements.

DESCRIPTION OF THE PREFERRED EMBODIMENT

Figure 1:
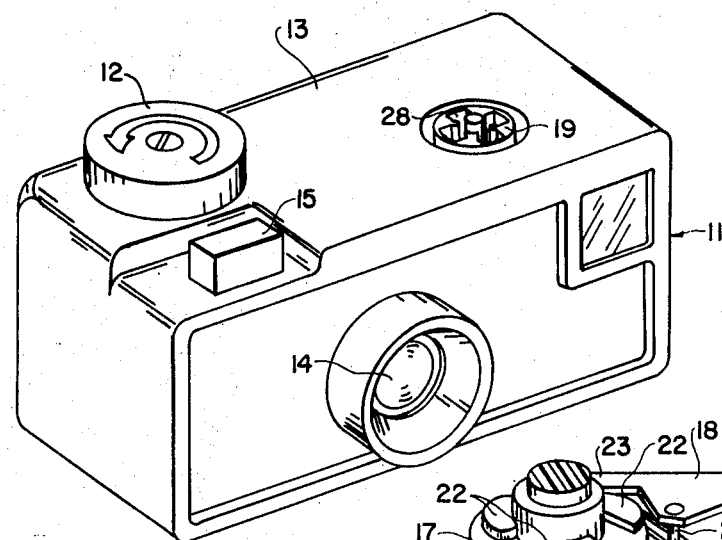
FIG. 1 is perspective view of a camera of the type that can incorporate a flashcube socket drive mechanism constructed in accordance with the present invention.

Referring first to FIG. 1 of the drawings, camera 11 is a typical simple camera adapted to receive roll film or a roll film cartridge. Winding knob 12, supported by camera housing 13, is connected to the film takeup spool within the camera and is unidirectionally rotatable in a counterclockwise direction to advance successive film exposure areas into alignment with lens 14. A film-metering mechanism within the camera temporarily arrests rotation of the winding knob whenever it has been rotated sufficiently to bring the next film exposure area into exposure position, whereupon the camera's shutter, not shown, can be operated by depression of shutter-operating member 15. Each time the shutter-operating member is depressed, it is latched temporarily in its depressed position until completion of the subsequent film-advancing operation; thus, preventing accidental double exposure of the film. Further details of a film metering and double exposure prevention mechanism particularly suitable for use in conjunction with the flashcube drive means of the present invention are disclosed in commonly assigned copending U.S. Pat. application, Ser. No. 802,864, entitled Camera With Metered Film Advance and Double Exposure Prevention filed concurrently herewith in the name of Paul J. Ernisse.

Figure 2:
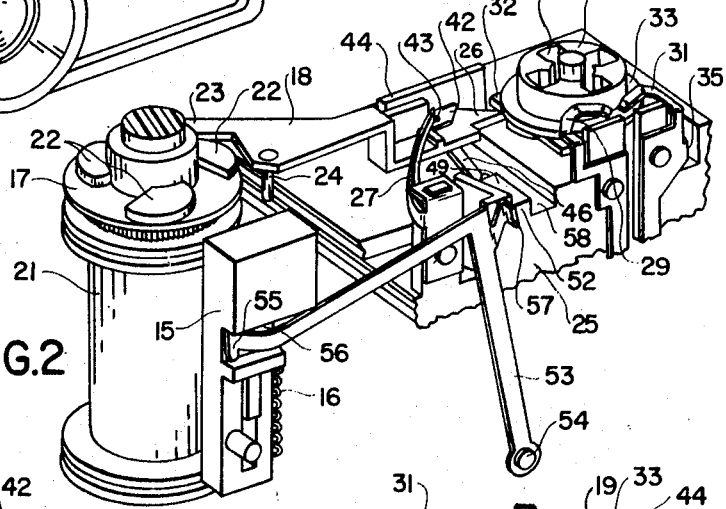
FIG. 2 is an enlarged perspective view of the internal elements of a camera embodying a flashcube socket drive mechanism according to a preferred embodiment of the present invention, omitting for purposes of clarity all those camera parts not essential to an understanding of the present invention.
Figure 3:
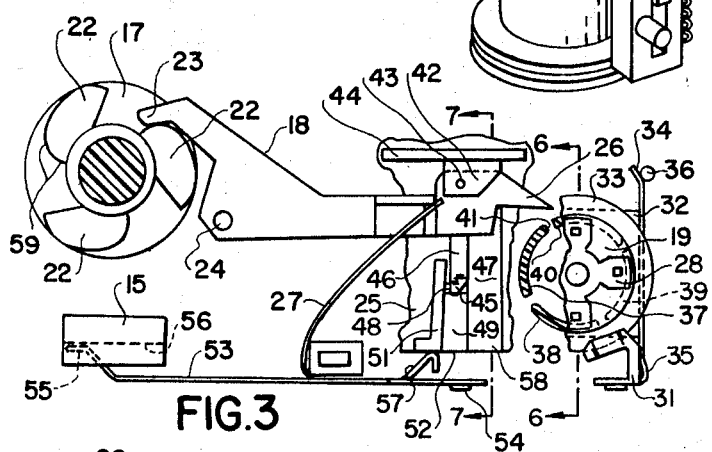
FIG. 3 is a fragmentary plan view of the camera mechanism depicted in FIG. 2 showing the respective positions of the illustrated components before the flashcube socket member is rotated in response to advancement of the film in the camera.

In FIGS. 2 and 3 of the drawings, the various components of the subject mechanism are shown in the respective positions which they assume after the shutter-operating member has been depressed to effect an exposure but before the winding knob has been rotated to advance the film. Accordingly, the shutter operating member is depicted in its depressed position in which it is temporarily retained against the influence of spring 16 by the double exposure prevention mechanism, not shown.

The principle components of the mechanism to which the present invention relates are winding member 17, drive lever 18 and socket member 19. The winding member is rotatably supported by the camera housing and is connected to winding knob 12 so that counterclockwise rotation of the latter imparts corresponding rotation both to the winding member and to the film takeup spool 21 engaged therewith. As identified at numeral 22, the winding member includes three similar equi-angularly disposed cam lobes laterally engageable with cam follower nose 23 at one end of drive lever 18. The drive lever is pivotally supported by pin 24 to the internal body member 25 of the camera, which is shown only fragmentarily for purposes of clarity. At its opposite end, the drive lever is provided with a pointed pawl tooth 26 and is biased rearwardly by a leaf spring 27 toward the position depicted in FIGS. 2 and 3.

Figure 4:
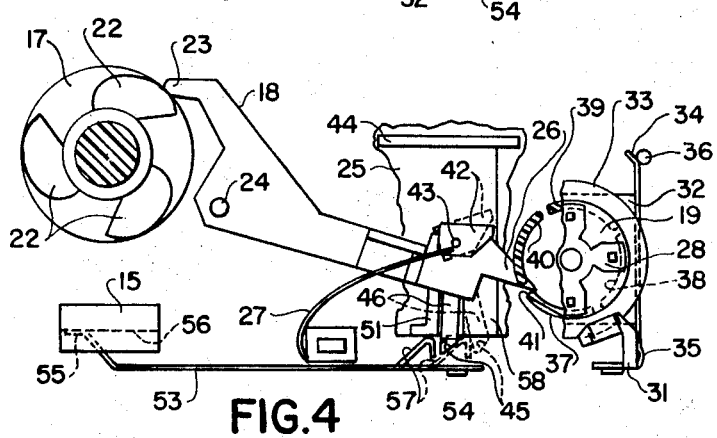
FIG. 4 corresponds to FIG. 3 and shows the respective positions of the depicted components after the socket member has been rotated but before the drive lever has returned to the position thereof illustrated in FIG. 3.
Figure 5:
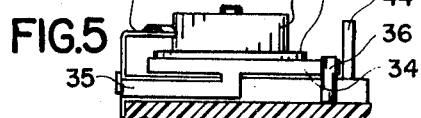
FIG. 5 is a somewhat simplified end elevational view of the structure illustrated in FIG. 3.
Figure 6:
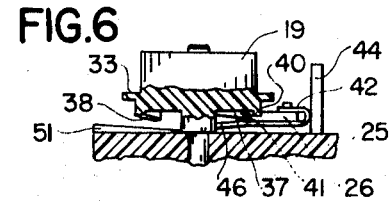
FIG. 6 is a somewhat simplified cross-sectional view taken along line 6—6 of FIG. 3.
Figure 7:
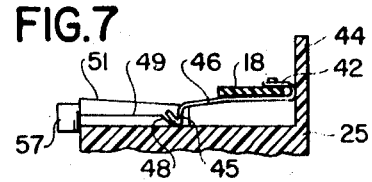
FIG. 7 is a somewhat simplified cross-sectional view taken along line 7—7 of FIG. 3.

The flashcube socket member 19 is supported on body member 25 for rotation about its vertical axis and includes a cross-shaped opening 28 adapted to receive the base portion of a flashcube, as is well known in the art. Accordingly, rotation of the socket member through successive 90° increments to the angular position shown in the drawings brings each flashcube bulb, in turn, into alignment with the scene to be photographed and into electrical contact with contact members 29 and 31 of the camera's bulb firing circuit. As best illustrated in FIGS. 3, 4 and 5, a square horizontal flange 32 is located on the socket member below circular rim 33 and is laterally engaged by the upper blade 34 of a slotted resilient detent spring 35 formed integrally with contact member 31 and abutting at its opposite end against stationary pin 36. This detent spring thus establishes the four rotational positions of the socket member, 90° apart, at which forwardly facing flashcube bulb is located in operative firing position.

Below square flange 32, four sloped arcuate ratchet teeth 37, 38, 39 and 40 project downwardly in horizontal alignment with pawl tooth 26. When the pawl tooth is in its rearwardmost position, as shown in FIG. 3, its pointed end is located behind the rearwardly facing vertical shoulder 41 of the ratchet tooth 37. Upon counterclockwise rotation of the winding member, the first cam lobe that encounters cam follower nose 23 pivots the drive lever to its forwardmost position shown in FIG. 4. Accordingly, pawl tooth 26 engages vertical shoulder 41 of the adjacent ratchet tooth 37 and rotates the socket member in a counterclockwise direction to its next position by overpowering the resilient influence of detent spring 35. Due to the slope of the lower faces of the ratchet teeth, pawl tooth 26 rides downwardly past the successive ratchet tooth 40 during return movement of the drive lever to the position shown in FIG. 3, without effecting the angular orientation of the socket member.

Since the winding member may be rotated through by one or more revolutions during each film-advancing operation, it will be seen that such rotation might cause the drive lever to index the socket member through more than only one 90° increment. To avoid that possibility, the drive lever is provided with a latch member 42 formed of resilient sheet metal and pivotally attached to the drive lever by a pivot pin 43. Upon movement of the drive lever to the position shown in FIG. 3, the rearward edge of the latch member abuts against vertical wall 44 of body member 25 and pivots the latch member to its illustrated position in which the hooked end 45 of its forwardly projecting tongue 46 rests on horizontal surface 47 of the body member directly behind upwardly sloping surface 48. As the drive lever subsequently pivots toward the position shown in FIG. 4, tongue 46 is resiliently deformed as its hooked end rides up sloped surface 48 and onto raised surface 49, thereby increasing the tongue's resilient upward influence on the pawl tooth and frictionally maintaining the end of the tongue against guide wall 51. Additionally, resilient deforming of the tongue 46 urges the pawl upwardly and into secure engagement with the flashcube socket. When the pawl tooth has moved forwardly by a sufficient distance to index the socket member to its next position, the hooked end of tongue 46 drops past the forward edge surface 52 of raised surface 49, as shown in FIG. 4, and thus temporarily blocks return movement of the driver lever. Consequently, subsequent rotation of the winding member has no influence on the socket member.

As previously mentioned, shutter-operating member 15 is retained in its depressed position by the double exposure prevention mechanism while the winding knob is being rotated to advance the film. A latch release member 53 is pivotally attached to the body member by pin 54 and is angularly positioned by the reception of its head portion 55 in slot 56 in the shutter-operating member. Thus, ear 57 of the latch release member remains in its inoperative position, shown in solid lines in the drawings, as long as the film-winding operation is in progress. When the metering mechanism blocks further rotation of the winding knob and allows the shutter-operating member to return to its raised position, the latch release member is thereby pivoted in a clockwise direction. Hence, ear 57 engages the hooked end 45 of tongue 46 and moves it sideways beyond edge surface 52 of the body member and into alignment with channel 58, as shown in broken lines in FIG. 4. Thereupon, the drive lever again pivots in a counterclockwise direction toward its former position under the influence of spring 27 as tongue 46 travels rearwardly along channel 58. As soon as such movement has positioned pawl tooth 26 behind the next ratchet tooth, the abutment of the rear edge of the latch member with vertical wall 44 again moves the hooked end 45 of tongue 46 behind sloped body member surface 48, thus restoring the mechanism to its initial condition.

In the foregoing description of the operation of the subject mechanism, it was assumed that cam follower nose 23 of drive lever 18 could return to the position shown in FIG. 3 upon the release of the latch member, but it is not unlikely that the cam follower nose may be aligned with one of the cam lobes when such release of the latch member takes place. Consequently, the pawl tooth can move rearwardly only until the cam follower nose encounters that cam lobe, whereafter the rotation of the winding member will cause that lobe to move the drive lever to the position shown in FIG. 4. It will be apparent, though, that the position of the hooked end of tongue 46 along its inoperative path of movement defined by channel 58 prevents the latch member from functioning; thereby allowing the drive lever to return to the position shown in FIG. 3 as that cam lobe moves beyond engagement with cam follower nose 23. As soon as the drive lever reaches the position shown in FIG. 3, however, the hooked end of the latch member is returned to its operative path of movement so that it can again disable the drive lever when the continuing rotation of the winding member has caused the subsequent cam lobe to effect proper indexing of the socket member. To reduce the dimensional tolerances required to insure that the latch member returns to its operative position only if the pawl tooth has moved rearwardly beyond the corresponding ratchet tooth, the leading portion of each cam lobe 22 is preferably steeply sloped, as shown at numeral 59 in FIG. 3, thus minimizing the possibility of the cam follower nose coming to rest along that portion of a cam lobe upon release of the latch member.

The invention has been described in detail with particular reference to an illustrative preferred embodiment thereof, but it will be understood that variations and modifications can be affected within the spirit and scope of the invention.

We claim:

1. A camera provided with a film-winding member rotatable through a plurality of consecutive film-winding cycles, a rotatable socket member and a socket rotating mechanism, said socket rotating mechanism comprising:

a drive lever supported for reciprocative pivotal movement, said drive lever including a cam follower at one end thereof and a pawl tooth at the opposite end thereof;

a cam member carried by said winding member, said cam member including a plurality of cam lobes movable successively into engagement with said cam follower by rotation of said winding member;

spring means for urging said cam follower toward said cam member so that movement of one of said cam lobes into and beyond engagement with said cam follower causes said pawl tooth to pivot from a first position to a second position in opposition to said spring means and then from said second position to said first position under the influence of said spring means;

a ratchet member carried by and rotatable with said socket member, said ratchet member being unidirectionally rotatable by said pawl tooth through a predetermined angle by each complete movement of said pawl tooth from said first position to said second position;

latch means for releasably latching said drive lever to maintain said pawl tooth in said second position in opposition to said spring means to prevent return movement of said pawl tooth to said first position during further rotation of said film-winding member in a single film-winding cycle; and means for releasing said latch means to permit return movement of said pawl tooth to said first position for a subsequent film-winding cycle.

2. A camera according to claim 1 in which said latch means comprises:

a latch member pivotally supported on said drive lever, said latch member including a tongue provided with a hook structure at one end thereof;

a first guide means establishing an operative path of movement followed by said hook structure in response to movement of said pawl tooth when said latch member is pivotally oriented to align said hook structure with said first guide means;

second guide means establishing an inoperative path of movement followed by said hook structure in response to movement of said pawl tooth when sail latch member is pivotally oriented to align said hook structure with said second guide means;

means defining a latch surface engageable by said hook structure at the location assumed by said hook structure along said operative path of movement upon arrival of said pawl tooth at said second position, whereby said hook structure releasably maintains said pawl tooth at said second position in opposition to said spring means; and said releasing means includes a latch release member movable from an inoperative location to an operative location at which said latch release member engages and displaces said hook member laterally out of engagement with said latch surface and into alignment with said inoperative path of movement by pivoting said latch member relative to said drive lever, whereupon said pawl tooth can be returned to said first position under the influence of said spring means.

3. A camera according to claim 2 including means defining an abutment surface engageable by said latch member as said pawl tooth arrives at said first position to pivot said latch member relative to said drive lever and thereby move said hook structure laterally from said inoperative movement path into said operative movement path.

4. A camera according to claim 2 provided with a shutter-operating member movable from a first location to a second location to actuate the camera shutter and with a double-exposure prevention mechanism adapted to releasably latch said shutter-operating member in said second location after each operation of said shutter and to release said shutter-operating member for movement to said first location in response to subsequent advancement of the camera film effected by rotation of said winding member, said latch release member being operatively connected to said shutter-operating member for movement to said operative location in response to movement of said shutter-operating member to said second location and for movement to said inoperative location in response to movement of said shutter-operating member to said first location.